United States Patent [19]

Beiding et al.

[11] 3,714,313
[45] Jan. 30, 1973

[54] AGGLOMERATING PARTIALLY DEHYDRATED GEL-DERIVED PSEUDOBOEHMITIC ALUMINA TO FORM STRONG POROUS SPHERES

[75] Inventors: William A. Beiding; Robert B. Emerson; Raymond L. Williams, all of Baton Rouge, La.

[73] Assignee: Kaiser Aluminum & Chemical Corporation, Oakland, Calif.

[22] Filed: Jan. 27, 1971

[21] Appl. No.: 110,318

[52] U.S. Cl. ............... 264/117, 23/313, 252/448, 252/463, 423/122, 423/131
[51] Int. Cl. ............... B01j 11/44, C01f 7/02
[58] Field of Search ..... 264/63, 117; 106/65; 23/141, 23/143, 313; 252/448, 463; 423/122, 131

[56] References Cited

UNITED STATES PATENTS

| | | |
|---|---|---|
| 3,669,904 | 6/1972 | Cornelius et al. ............... 252/463 |
| 3,679,605 | 7/1972 | Sanford et al. ............... 252/463 |
| 3,539,468 | 11/1970 | Wright ............... 23/143 |
| 3,630,670 | 12/1971 | Bell et al. ............... 23/143 |
| 3,411,878 | 11/1968 | Graulier et al. ............... 23/143 |
| 3,264,069 | 8/1966 | Getty ............... 264/177 |
| 3,009,885 | 11/1961 | Bertolacini ............... 23/143 |
| 2,881,051 | 4/1959 | Pingard ............... 23/313 |
| 3,222,129 | 12/1965 | Osment et al. ............... 23/141 |
| 3,480,389 | 11/1969 | Graulier ............... 23/143 |
| 3,520,654 | 7/1970 | Carr et al. ............... 23/143 |

Primary Examiner—Donald J. Arnold
Assistant Examiner—John H. Miller
Attorney—Paul E. Calrow, Harold L. Jenkins and Andrew E. Barlay

[57] ABSTRACT

Gel-derived crystalline alumina containing at least 40 percent pseudoboehmite and having low cationic and anionic impurity levels is partially dehyrated to an LOI of 22-34 percent, ground to at least 85 percent minus 325 mesh, shaped into spheres by conventional agglomerating devices while adding sufficient water to rise the total water content to 52-65 percent. These shaped spheres, without any ageing treatment, are then heated to a temperature in the range of 350°-650°C for a time necessary to produce the desired strength. The resultant spheres are strong and have a high total porosity, at least 20 percent of which consists of pores in the 120-800 A° size range. They are useful as desiccants, active alumina and catalyst supports.

5 Claims, No Drawings

AGGLOMERATING PARTIALLY DEHYDRATED GEL-DERIVED PSEUDOBOEHMITIC ALUMINA TO FORM STRONG POROUS SPHERES

BACKGROUND OF THE INVENTION

This invention relates to gel-derived alumina shapes of improved physical and mechanical properties and to a method of making these shapes. More particularly, the present invention relates to thermally stable gel-derived alumina shapes characterized by high surface area and porosity, low attrition loss and high crushing strength and to a method of making these shapes.

Gel-derived aluminas are widely utilized, for example, as catalysts, catalyst supports and also as desiccants. These aluminas generally exhibit relatively high surface area and porosity and are thermally stable at the high temperatures commonly utilized in catalytic reactions and in drying. For many applications, it is important to employ shaped products, as these products exhibit higher strength properties, substantially reduced resistance to flow of gaseous compounds through a reactor filled with the catalyst, and are easier to load and remove from reactors than powdery or granular materials. The shaped products in general have many desirable properties characteristic of granular products; for example, spheres, nodules and hollow cylinders of the prior art have high surface area and porosity and also thermal stability. Nevertheless, due to the microcrystalline and poorly organized crystal structure, the shapes heretofore formed from gel-derived aluminas lack the combination of such properties with the strengths desired and required in most fields of applications.

Recognition of the desirability of using spherical products and the lack of physical strength of the existing products led to earlier suggestions all directed to the improvement of strength properties. Thus, it has been suggested in U.S. Pat. No. 3,380,933 that gel-derived alumina shapes of increased strength be produced by dehydration of hydrous alumina, followed by shaping and sintering at temperatures between 1500°C and 1800°C. The shaped and sintered product is shown to exhibit strength imparted by the sintering step; however, due to the use of high temperatures within the ranges indicated, the active surface associated with the pores having pore diameters in the 120–800 Å range is significantly reduced, thus making the product less desirable for use as a catalyst base.

Another process for shaping gel-derived alumina particles is described in U.S. Pat. No. 3,264,069, wherein it is suggested to dehydrate gel-derived alumina to a loss on ignition of about 10 percent by weight, followed by grinding, shaping, aging and calcination to a low loss on ignition. While the resultant product as described possesses improved hardness and abrasion resistance, the dehydration treatments and aging utilized materially affect other properties of the balls, for example, phase stability. Even more significantly, porosity of the material is reduced, thus resulting in a dense product which has less porosity in the important pore size range desired in the catalyst industry.

All the prior art efforts indicated the need for a gel-derived alumina shape which not only exhibits high crushing strength, low abrasion loss generally less than about 1 percent, high attrition resistance, generally less than about 70 percent, but also high porosity and high active surface coupled with thermal stability. It has now been surprisingly discovered that such a product can be made from gel-derived aluminas without sacrificing any of the properties required by the catalyst industry.

BRIEF SUMMARY OF THE INVENTION

Gel-derived alumina shapes of high strength and high porosity are made from pseudoboehmitic alumina containing at least about 40 percent by weight of pseudoboehmite. The pseudoboehmitic alumina is dried after precipitation to a water content between about 22–34 percent by weight, followed by grinding to a particle size range, wherein at least 85 percent of the ground particles passes through a screen having openings of 0.044 mm. The ground particles are then shaped in the presence of water added in an amount determined by the formula of $W_s = W_t - W_o$, wherein $W_s$ is the water added to the shaping, $W_t$ is the total water content of the alumina during shaping and $W_o$ is the water content of the ground alumina prior to shaping, and wherein $W_t$ is maintained between about 52–65 percent by weight of the alumina. The shaped particles can then be thermally treated to obtain crushing strengths in excess of about 7 kg, total porosities in excess of about 0.6 cc/g with surface areas in excess of about 220 m²/g.

DETAILED DESCRIPTION OF THE INVENTION

The present invention provides a gel-based alumina shape, possessing thermal stability, high surface area and high porosity, further characterized by high attrition resistance and high crushing strength.

In accordance with the process of the present invention, gel-derived aluminas are partially dewatered, followed by grinding to a predetermined particle size. The ground particles are then shaped with water while controlling the water content of the alumina during shaping within closely controlled limits. The preferred gel-derived aluminas for use herein are pseudoboehmitic aluminas characterized by a pseudoboehmite content of at least about 40 percent by weight as determined by X-ray diffraction analysis in comparison to an essentially pure standard pseudoboehmite exhibiting an X-ray diffraction peak in the 6.5–6.8 Å range as measured by copper Kα radiation at 14.5°, 2 Θ angle.

The gel-derived alumina utilized in the present invention can be advantageously prepared by the neutralization of an alkali aluminate solution with a strong acid or an acidic aluminum salt, such as $Al(NO_3)_3$, $Al_2(SO_4)_3$ or $AlCl_3$. The preferred alkali aluminate solution is a sodium aluminate solution, while the strong acid can be selected from the group of acids including $HCl$, $HNO_3$ and $H_2SO_4$.

An advantageous process for the preparation of pseudoboehmitic alumina containing a high percentage of pseudoboehmite is described in U.S. Pat. No. 3,630,670. In accordance with the process of the above-referenced application to N. Bell et al, a sodium aluminate solution having an alumina ($Al_2O_3$) to caustic (expressed as $Na_2CO_3$) weight ratio from about 0.7 to about 0.9 is neutralized with an aqueous nitric acid solution (50–200 grams/liter $HNO_3$) under carefully controlled temperature and pH conditions. The resultant neutralization product is filtered and washed and the hydrous alumina product of substantially pseudoboehmitic structure and of low impurity content is recovered. While the aforedescribed process produces hydrous alumina of exceptionally high quality, other processes involving a reaction between alkali aluminate solutions and acids or acidic aluminum salts also resulting in a gel-derived alumina containing at least 40 percent by weight of pseudoboehmite alumina can be utilized for the present process.

In general, the freshly precipitated hydrous alumina is contaminated with both anionic and cationic impurities. These impurities should be removed prior to shaping, as they may affect the performance of the alumina when used as a catalyst support. Impurities most commonly encountered include $Na_2O$ or $K_2O$ and anions such as $Cl$, $SO_4$ or $NO_3$, depending on the acid or acidic aluminum salt employed to neutralize the alkali aluminate solution.

Suitable purification processes include washing of the precipitated hydrous alumina after filtration with deionized water and/or repulping of the filter cake in deionized water. After these purification treatments, the impurity level of the pseudoboehmitic alumina is suitably low; it generally exhibits a cationic impurity level of less than about 0.1 percent and an anionic impurity level of less than about 0.2 percent.

The wet purified alumina is then prepared for shaping. Due to the high free and bound water content of the hydrous alumina, successful shaping cannot be accomplished without reduction in this water content. Most suitably, a controlled drying treatment is employed which will reduce the water content of the hydrous alumina to such an extent as to allow preparation of shapes. Such drying can be conveniently accomplished in drying devices known in the art, such as spray-driers. It has now been surprisingly discovered that in order to attain the heretofore described combination of optimum properties, namely, high crushing strength, high porosity and high surface area, certain critical controls must be maintained. Not only is it essential to individually control water content during dehydration and during shaping within critical limits, but it is also necessary to maintain distinct relationships between screen analysis of the ground pseudoboehmitic alumina, water content of the partially dehydrated alumina and water content during shaping. In other words, the novel combination of the final properties of the shaped material is a function of all three above defined variables.

Thus, under the term "control", for the purposes of this invention the following operating steps are understood:

a. water content control of the effluent alumina from the dryer;
b. particle size control after partial dehydration and prior to shaping;
c. water content control during shaping.

a. Water content control during drying

Regardless of the type of drying equipment utilized, the water content of the dried gel-derived alumina should be controlled to be between about 22 and about 34 percent by weight, preferably between about 24–32 percent by weight. The hydrous alumina, which has been filtered and washed, usually contains about 80 percent by weight water. Thus, the drying step employed removes a substantial portion of this water content. The rate of water removal is not considered to be critical; nevertheless, it should be set in a manner so as to accomplish the desired goal, i.e., reduction of the water content to about 32 percent, or below, but not below about 22 percent by weight without, however, prolonged residence time in the drying equipment.

b. Particle size control

The dried pseudoboehmitic alumina is usually recovered from the drier in a finely divided state. Nevertheless, in order to assure uniformity in the forming operation, it is recommended that the dried alumina particles be ground to a particle size wherein at least 85 percent, preferably 90 percent, of the alumina particles pass through a screen having openings of 0.044 millimeters (equivalent to a 325 mesh U.S. Standard Sieve). It has been observed that grinding of the particles to the aforementioned particle size improves the attrition resistance, crushing strength and, in general, the physical properties of the final shaped product. It is believed that grinding of the particles will eliminate voids and consequently allows better compaction of the shapes without, however, a reduction in actual porosity or surface area. Regardless of the explanation provided above, the described control of the grinding operation is essential in combination with the other two controls to achieve the unique product.

c. Shaping operation

The dried and ground alumina particles are then subjected to a shaping operation. The shapes produced may be of any desired configuration; for example, spheres, spheroids or nodules. Regardless of the configuration of the shapes to be produced in accordance with the present invention, the water content, i.e., the quantity of water introduced to effect shaping, should be carefully controlled. It was found that in order to obtain shapes of excellent physical properties, the water added to the shaping operation should not exceed an amount defined by the following formula:

$W_s = W_t - W_g$ wherein $W_s$ is water added to shaping, $W_t$ is total water content of the alumina during shaping and $W_g$ is water content of the ground gel-derived alumina, all expressed in weight percent and based on the $Al_2O_3$ content of the pseudoboehmitic alumina. It was found that excellent results can be achieved when $W_t$ is between about 52–65 percent by weight. Thus, for example, when the water content of the ground alumina is about 28 percent by weight prior to shaping ($W_g$), the water quantity to be added to the shaping ($W_s$) varies between about 24–37 percent by weight. Water contents are determined by calcining the dried and ground pseudoboehmitic alumina at 1000°C for 1 hour to obtain its total free and bound water content, which is designated and used hereinafter as loss on ignition (LOI). Within the limits given, i.e., total water contents of 52–65 percent by weight, it has been found that there is a correlation between the water content employed in the shaping step of the invention and the bulk density of the gel-derived alumina particles. It was found that if the bulk density of the alumina particles is in the range of about 25–35 lbs./ft.$^3$ (400–560 kg/m$^3$), total water contents in the range of about 52–58 percent produce optimum results, while for bulk densities below about 25 lbs/ft$^3$ (400 kg/m$_3$), total water contents of 56–65 percent provide the desired end results.

To obtain best results, i.e., shapes exhibiting optimum physical properties, it is recommended that the water content of the dried and ground alumina be ascertained prior to shaping. It is also possible to adjust the drying equipment in such a manner as to consistently produce the pseudoboehmitic alumina of predetermined water content, which generally does not change during the grinding step. Small variations in the water content of the dried alumina, i.e., 1–3 percent by weight, will only slightly alter the required water addition in the shaping step; thus, once the drying is conducted in a consistent manner, only periodic moisture checks are required.

The initiation of shaping can be accomplished by any of the well known techniques in devices, such as rotating pans, cylinders and drums, but under steady state operating of the shaping device it is important to control the ratio of water feed to alumina feed to achieve uniform production of alumina of the described critical water content. Other methods of shaping can also be utilized provided the water to alumina weight percentages described above are maintained.

After the shapes have been formed, they are removed from the forming apparatus. Generally, the formed shapes are subjected to a thermal treatment or activation treatment to fully develop the strength and surface properties of the shaped, gel-derived alumina. Thermal treatments in the range of 350°–650°C are usually employed for the activation.

The thermally treated shapes can be directly employed as desiccant or active alumina, or, if desired, impregnated with solutions of metallic salts to form catalyst compounds. In many instances, admixture with the metallic salts can be accomplished prior to the grinding step; grinding will cause uniform distribution of the catalytic agents throughout the alumina. The admixture can then be subjected to the aforesaid shaping operation, provided the limits in water content are strictly adhered to. Another mode of impregnation or admixture with the catalytic agents can be accomplished directly during shaping. In this instance, the metallic salts can be either added in an aqueous solution as the nodulizing liquid or in dry form directly to the forming apparatus. In each mode of admixture, water content control must be exercised in accordance with the principles hereinbefore described.

It was found that gel-derived alumina shapes, when processed in accordance with the present invention, will exhibit high crushing strength, generally in excess of about 7 kg (15 lbs.), high total porosity, usually in excess of about 0.6 cm$^3$/g, wherein at least 20 percent of the total porosity is provided by pores in the 120–800 A pore size range, an attrition loss below about 70 percent, and an abrasion loss of less than about 1 percent, a combination of properties hitherto unobtainable by conventional methods.

The following Tables and Examples will further illustrate the novel principles of the present invention:

Example I

Pseudoboehmitic alumina containing about 90 percent by weight pseudoboehmite and containing about 82 percent by weight water (free and bound) as determined by heating to 1000°C for 1 hour was dried in a spray drier to a water content of about 23 percent by weight. The dried product was then ground to a particle size wherein about 90 percent by weight of the particles passed through a screen having screen openings of 0.044 mm (U.S. Standard screen 325 mesh). The ground particles were then added in increments to a cylindrical rotating pan having an inside diameter of about 76 cm and a depth of about 23 cm. The tilt of the pan was kept constant during shaping at about 28° from the vertical while the pan was rotated at approximately 40 rpm. Water was introduced in increments into the pan through nozzles directed against the wall of the pan in a manner as to obtain a total water content in the alumina of about 56 percent. The shapes which had a spherical appearance and retained their pseudoboehmite content were then removed and, without aging, thermally treated at about 400°C for about 1 hour. The spheroids were then analyzed, with the results shown in Table I.

Example II

Pseudoboehmitic gel-derived alumina ground to a particle size wherein 90 percent passed through a screen having openings of 0.044 mm, containing in excess of about 80 percent by weight pseudoboehmite and having a combined free and bound water content of about 30 percent by weight, was introduced at a uniform rate into the forming device described in Example I. Water was also introduced into the forming device so as to maintain a total water to alumina weight percent of about 57.2 percent. The shaping was accomplished at the same rpm and tilt described in Example I. The formed shapes were then removed from the device, activated without aging at about 400°C for 1 hour. The activated shapes were then analyzed and the results are shown in Table II.

Experiments were conducted by varying one of the variables described above, while maintaining the other variables between the critical limits shown. Thus, a shaped product was prepared by drying a pseudoboehmitic alumina containing in excess of 80 percent by weight of pseudoboehmite to a water content of about 19 percent by weight. The dried alumina was then ground to a particle size range wherein about 90 percent by weight of the ground particles passed a screen having openings of 0.044 mm. The ground alumina was then shaped as described in Example I by adding sufficient water to obtain a water content of about 56 percent of the weight of the alumina content of the shapes. The shapes were then thermally treated at about 400°C for about 1 hour and analyzed. The shapes thus produced, while retaining high porosity and high surface area, exhibited an average strength below about 4.5 kg.

In another experiment the particle size range was changed, while the water content of the partially dehydrated pseudoboehmitic alumina and the water content of the shapes were kept within the critical limits disclosed. The pseudoboehmitic alumina was ground to a particle size range wherein about 60 percent by weight passed a screen having openings of 0.044 mm. The thermally treated shapes exhibited high surface area and a crushing strength near the minimum achievable by the present invention; however, the attrition loss of the shapes was totally unacceptable, being in excess of 90 percent.

In another experiment the particle size and the water content of the partially dehydrated pseudoboehmitic alumina were kept within the indicated critical limits and only the water content of the shapes was changed by adding only enough water to the shaping to obtain shapes having a loss on ignition of about 47 percent by weight. The pseudoboehmitic alumina did not form shapes even after the tilt and rpm were varied, but strong shapes were immediately obtained after the water content was upwardly adjusted to within the critical limits disclosed.

Table I

Physical Characteristics of Gel-derived Alumina Shapes Made from Pseudoboehmitic Alumina *

| | |
|---|---|
| Surface area m²/g | 339 |
| Total porosity cc/g | 0.82 |
| Porosity in 120–800 A range cc/g | 0.17 |
| Bulk density kg/m³ | 467 |
| Loss on ignition % | 6.2 |
| Crushing strength kg[1] | 8.8 |
| Attrition loss %[2] | 8.3 |
| Abrasion loss %[3] | 0.4 |
| Appearance and size | Spheroids of 3.2 mm av. diam. |

* The pseudoboehmitic alumina starting material for the shapes contained about 30.8 percent water after spray-drying as determined by loss on ignition and 22.8 percent water as determined by drying at 104°C for about 1 hour.

(1) Crushing Strength A sample of spheroids having an average diameter of 3.2 mm was placed on a screen having openings of 3.36 mm and 25 spheroids retained in the openings of the screen were removed for testing while both the undersized and oversized spheroids were discarded. Each of the 25 spheroids was placed in a "Chatillon Model HTCM" Crushing Strength Tester operated at a speed of 3. The crushing strength was determined by reading the pressure in kg required to crush the spheroid. The results for the 25 spheroids were averaged and reported as "crushing strength in kg".

(2) Attrition Loss (%) A sample of 30 grams of spheroids of 3.2 mm average diameter was placed into a 1000 ml Erlenmeyer having a hole of 25.4 mm in the bottom. This hole was covered with a screen having openings of 1.41 mm. A rubber stopper was inserted at the top of the flask and in the rubber stopper a metal inlet nozzle was inserted having an internal diameter of 0.5 cm. The flask was then inverted, fixed in this position and connected to an air pressure regulating system. Air was admitted for a period of 20 minutes at a rate of 10.4 m³/hour and subsequently the material was screened on a screen having openings of 1.41 mm. The amount remaining on the screen was then weighed. The attrition loss was calculated as follows: Attrition loss % = (30.0 − Final wt. of sample)/(30) × 100

(3) Abrasion Loss (%) A weighed amount of spheroids (av. diameter 3.2 mm) were tapped on a RO-TAP machine for 30 minutes. The material was then screened and the material passing through the screen (0.595 mm. openings) was weighed and recorded as abrasion loss.

Table II

| | |
|---|---|
| Surface Area m²/g | 335 |
| Total porosity cc/g | 0.84 |
| Porosity in 120–800 A range cc/g | 0.17 |
| Bulk density kg/m³ | 490 |
| Loss on ignition % | 6.0 |
| Crushing strength kg | 11.7 |
| Attrition loss % | 7.6 |
| Abrasion loss % | 0.54 |
| Appearance and size | Spheroids of 3.2 mm av. diam. |

It can be observed from the data shown above that shapes of high porosity, strength and surface area can be made without the necessity of activating the pseudoboehmitic alumina prior to the shaping step and also without requiring aging of the shapes to impart the desired strength. Avoidance of the activation step prior to grinding and shaping will allow retention of the pseudoboehmitic structure and will not cause reduction in the porosity prior to shaping, resulting in a product of overall superior properties.

It is to be understood that the process of the present invention is capable of producing shapes of varying appearance and size without changes in the critical parameters described in detail above.

What is claimed is:

1. A process for making shapes of high strength, controlled bulk density and high porosity from gel-derived alumina which comprises:
   a. partially dehydrating a gel-derived, crystalline alumina containing at least about 40 percent by weight of pseudoboehmite and having an anionic impurity content less than about 0.2 percent and a cationic impurity content less than about 0.1 percent to a loss on ignition of about 22–34 percent by weight;
   b. grinding the partially dehydrated alumina to a particle size range wherein at least 85 percent by weight of the ground particles pass through a screen having openings of 0.044 mm;
   c. shaping the ground alumina in the presence of water added in an amount determined by the formula of $W_s = W_t - W_g$, wherein $W_s$ is the water added to the shaping, $W_t$ is the total water content of the alumina during shaping and $W_g$ is the water content of the ground alumina prior to shaping, and wherein $W_t$ is maintained between about 52–65 percent by weight of the alumina;
   d. recovering the shaped alumina; and
   e. thermally treating without ageing the shaped alumina at temperatures in the range between about 350°–650°C for a time sufficient to develop a crushing strength of at least about 7 kg, an attrition loss below about 70 percent and an abrasion loss of less than about 1 percent.

2. Process according to claim 1, wherein the gel-derived alumina is dehydrated to a total water content of about 24–32 percent by weight.

3. Process according to claim 1, wherein the total water content ($W_t$) of the shaped alumina is about 52–58 percent of the weight of the alumina content of the shape, and the bulk density of the ground, gel-derived alumina is between about 400–560 kg/m³.

4. Process according to claim 1, wherein the total water content ($W_t$) of the shaped alumina is about 56–65 percent of the weight of the alumina content of the shape, and the bulk density of the ground, gel-derived alumina is less than about 400 kg/m³.

5. Process according to claim 1, wherein the gel-derived alumina is ground to a particle size range wherein at least about 90 percent by weight passes through a screen having openings of 0.044 mm.

* * * * *